United States Patent
Sun (10) Patent No.: US 10,857,639 B2
(45) Date of Patent: Dec. 8, 2020

(54) TOOL EXCHANGE DEVICE OF TOOL MAGAZINE

(71) Applicant: Chen Sound Industrial Co., Ltd., Taichung (TW)

(72) Inventor: Ying Sun, Taichung (TW)

(73) Assignee: Chen Sound Industrial Co., Ltd., Taichung (TW)

( * ) Notice: Subject to any disclaimer, the term of this patent is extended or adjusted under 35 U.S.C. 154(b) by 110 days.

(21) Appl. No.: 16/249,168

(22) Filed: Jan. 16, 2019

(65) Prior Publication Data

US 2020/0139499 A1 May 7, 2020

(30) Foreign Application Priority Data

Nov. 7, 2018 (TW) .............................. 107139563 A (51) Int. Cl.
  *B23Q 3/157*  (2006.01)
  *B23Q 3/155*  (2006.01)
  *B23Q 1/62*  (2006.01)

(52) U.S. Cl.
  CPC .......... *B23Q 3/15536* (2016.11); *B23Q 1/623* (2013.01); *B23Q 3/15773* (2013.01);
  (Continued)

(58) Field of Classification Search
  CPC ......... B23Q 2003/155411; B23Q 2003/15531; B23Q 3/15773; B23Q 3/15746; Y10T 483/1752; Y10T 483/1776; Y10T 483/1779; Y10T 483/176; Y10T 483/1757; Y10T 483/1836
  (Continued)

(56) References Cited

U.S. PATENT DOCUMENTS 4,837,919 A * 6/1989 Hoppe ................. B23Q 3/1554
  483/38
5,554,087 A * 9/1996 Hwang ................ B23Q 3/1578
  483/62

(Continued)

FOREIGN PATENT DOCUMENTS

DE         19728159 C1 *  1/1999
DE    102009007413 A1 *  8/2010
  (Continued)

*Primary Examiner* — Erica E Cadugan
(74) *Attorney, Agent, or Firm* — Muncy, Geissler, Olds & Lowe, P.C.

(57) ABSTRACT

A tool exchange device for tool magazine includes a base having a driving member, a pressure cylinder, a movement member pivotally connected to the base adjacent to the driving member, and a tool retrieving member disposed on the movement member. The driving member has a connection portion and a twisting portion. The pressure cylinder has a piston rod pivotally connected to the connection portion for driving the driving member. The twisting portion is removably received in a receiving portion of the movement member. With the rotation of the driving member, the twisting portion forces the movement member to move along an arc shape route, such that the movement member rotates by an angle, and the tool retrieving member sways between a vertical and horizontal positions. Therefore, the tool exchange device is driven with a lower force, and the tool retrieving tool stably sways.

10 Claims, 11 Drawing Sheets

(52) U.S. Cl.
CPC ............ *B23Q 2003/155407* (2016.11); *B23Q 2003/155411* (2016.11); *Y10T 483/1776* (2015.01); *Y10T 483/1779* (2015.01); *Y10T 483/1836* (2015.01)

(58) Field of Classification Search
USPC .......................... 483/38, 40, 48, 49, 41, 62
See application file for complete search history.

(56) References Cited

U.S. PATENT DOCUMENTS

| | | | | |
|---|---|---|---|---|
| 5,704,885 | A | * | 1/1998 | Lee ................... B23Q 3/15526 483/62 |
| 9,352,433 | B2 | * | 5/2016 | Lee ................... B23Q 3/15713 |

FOREIGN PATENT DOCUMENTS

| | | | | |
|---|---|---|---|---|
| JP | 56-021743 | A | * | 2/1981 |
| JP | 57-061441 | A | * | 4/1982 |
| JP | 61-168443 | A | * | 7/1986 |
| JP | 61-168445 | A | * | 7/1986 |
| JP | 62-028141 | A | * | 2/1987 |
| JP | 62-277236 | A | * | 12/1987 |
| JP | 6021633 | Y2 | * | 6/1994 |
| JP | 2001-062660 | A | * | 3/2001 |
| TW | M543136 | U | | 6/2017 |

\* cited by examiner

TOOL EXCHANGE DEVICE OF TOOL MAGAZINE

BACKGROUND OF THE INVENTION

1. Field of the Invention

The present invention relates to tool exchange devices of tool magazine, and more particularly, to a tool exchange device of tool magazine of machine tools for exchanging the tools thereof.

2. Description of the Related Art

A conventional machine tool processes a work piece through the tool installed on the spindle of the machine tool. The tool installed on a conventional spindle is manually exchanged, which may slow down the processing efficiency due to a relatively slow installation operation. Therefore, an automatic tool exchanging technique is developed by the industry, which adds a tool magazine besides the machine tool, with a tool exchange device disposed between the machine tool and the tool magazine. Therein, various tools are stored in the tool magazine, such that the tool exchange device automatically takes out the target tool which is installed on the spindle of the machine tool. Also, the tool originally installed on the spindle is retrieved from the spindle and placed back into the tool magazine.

As disclosed by TWM543136, a tool magazine has a plurality of tool sleeves, and each sleeve has a roller, which is disposed on a control portion driven by a piston cylinder. The piston cylinder drives the control portion to move along a straight line orientation, the tool sleeve reciprocates between a vertical position and a horizontal position for swaying the tool sleeve.

However, the control portion of such art is directly mounted on the roller on which the sleeve is disposed. In other word, there is no force-saving device disposed between the piston cylinder and roller on which the tool sleeve is disposed. Therefore, the moment arm formed between the roller and the tool sleeve is relatively short. Based on the fact that the piston cylinder has to offer a force sufficient to directly drive the tool sleeve to sway, the piston cylinder shall have a larger force output specification. As a result, a higher cost and a larger volume of the piston cylinder are inevitable. Also, the piston cylinder drives the control portion to move along a straight line orientation for swaying the tool sleeve. As a result, although the tool sleeve is allowed to be sway quickly, the tool sleeve will waver during the swaying process, and the swaying speed is kept form being consistent in the swaying process.

Therefore, the resolutions for improving such issues are desirable.

SUMMARY OF THE INVENTION

For improving the issues above, a tool exchange device of tool magazine is provided. When the driving member is driven by the pressure cylinder to rotate, with the rotation of the driving member, the twisting portion of the driving member twists the receiving portion of the movement member along an arc route, such that the tool retrieving member rotates to sway between the vertical position and the horizontal position, thus completing the tool sleeve swaying operation during the tool exchange process.

A tool exchange device of tool magazine in accordance with an embodiment of the present invention comprises:

a base;
a driving member pivotally connected with the base by an axle member, a connection portion and a twisting portion being disposed on two opposite ends of the driving member, a distance between the connection portion and the axle member being larger than a distance between the twisting portion and the axle member;
a pressure cylinder disposed on the base and having an extendable piston rod, one end of the piston rod pivotally connected with the connection portion for driving the driving member to rotate about the axle member;
a movement member pivotally connected with the base and neighboring the driving member, the movement member having a receiving portion, the twisting portion being movably received in the receiving portion, the twisting portion twisting the movement member upon a rotation of the driving member for rotating the movement member by an angle; and
a tool retrieving member disposed on the movement member, the tool retrieving member swaying between a vertical position and a horizontal position according to a rotation angle of the movement member.

With such configuration, one end of the piston rod is connected with the movement member by a rotatable driving member. With the driving member, the length of the moment arm between the end of the piston rod and the movement member is increased, so as to form a force-saving mechanism when the piston rod drives the movement member to sway. Therefore, the specification of the pressure cylinder having a lower force output is applicable, so as to lower the cost of the pressure cylinder and the space demand for the pressure cylinder volume.

In addition, the twisting portion of the driving member twists the receiving portion of the movement member along an arc route, so as to sway the tool retrieving member between the vertical position and the horizontal position. Therefore, the force imposing position of the twisting portion upon the movement member moves along the arc route according to the swaying angle of the movement member, such that the wavering and the inconsistency of swaying speed of the tool sleeve are prevented, facilitating a stable and smooth swaying of the tool sleeve.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 11, a tool exchange device 100 of tool magazine in accordance with an embodiment of the present invention comprises a base 10, a driving member 20, a pressure cylinder 30, a movement member 40, and a tool retrieving member 50. The tool magazine in the embodiment is a matrix type tool magazine 60, comprising a tool shelf 61, a transverse slide carriage 62, and a longitudinal slide carriage 63. The base 10 is fixed on the longitudinal slide carriage 63, and the longitudinal slide carriage 63 is slidably disposed on the transverse slide carriage 62.

The driving member 20 is pivotally connected with the base 10 by an axle member 21. The driving member 20 has a connection portion 22 and a twisting portion 23. The connection portion 22 and the twisting portion 23 are disposed on two opposite ends with respect to the axle member 21. The distance between the connection portion 22 and the axle member 21 is larger than the distance between the twisting portion 23 and the axle member 21. In an embodiment of the present invention, the connection portion 22 has a rotation axle 221, and the twisting portion 23 has a twisting rod 231. An axle bore 24 is formed between the connection portion 22 and the twisting portion 23, such that the axle member 21 passes through the axle bore 24 for pivotally connecting the driving member 20 on the base 10.

The pressure cylinder 30 is disposed on the base 10. The pressure cylinder 30 has a piston rod 31, which is extendable with respect to the pressure cylinder 30. One end of the piston rod 31 is pivotally connected with the connection portion 22. The piston rod 31 is able to extend for driving the driving member 20 to rotate about the axle member 21. Upon the rotation of the driving member 20, the connection portion 22 and the twisting portion 23 rotate in opposite directions. In an embodiment of the present invention, the pressure cylinder 30 has an end away from the piston rod 31 pivotally connected with the base 10, so as to be swayable with respect to the base 10. Also, one end of the piston rod 31 of the pressure cylinder 30 is connected with the rotation axle 221. When the piston rod 31 extends to drive the driving member 20 to rotate, the pressure cylinder 30 accordingly sways on the base 10.

Figure 6:
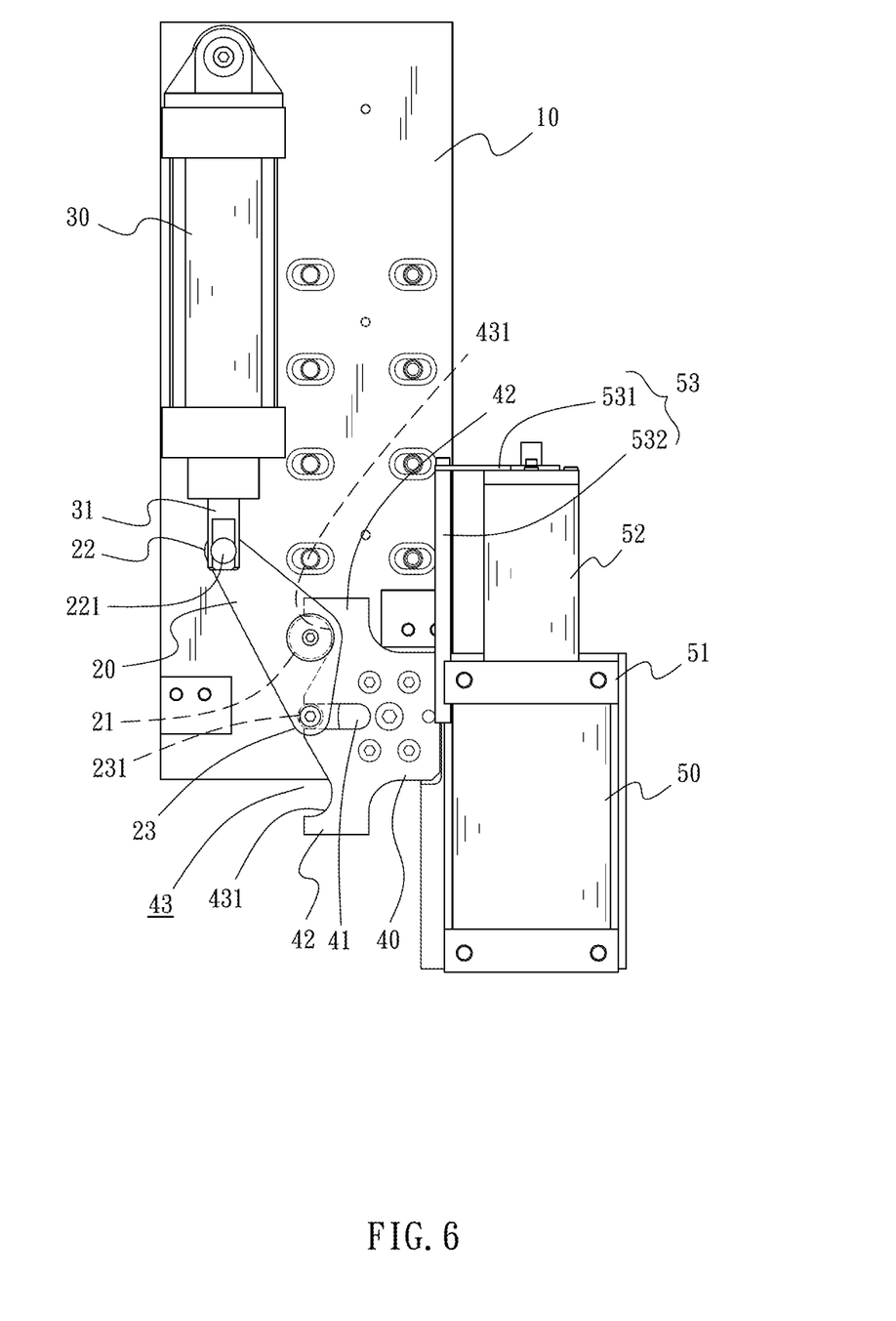
FIG. 6 is a schematic view of the present invention illustrating the tool retrieving member placed at the vertical position in the initial status.
Figure 7:
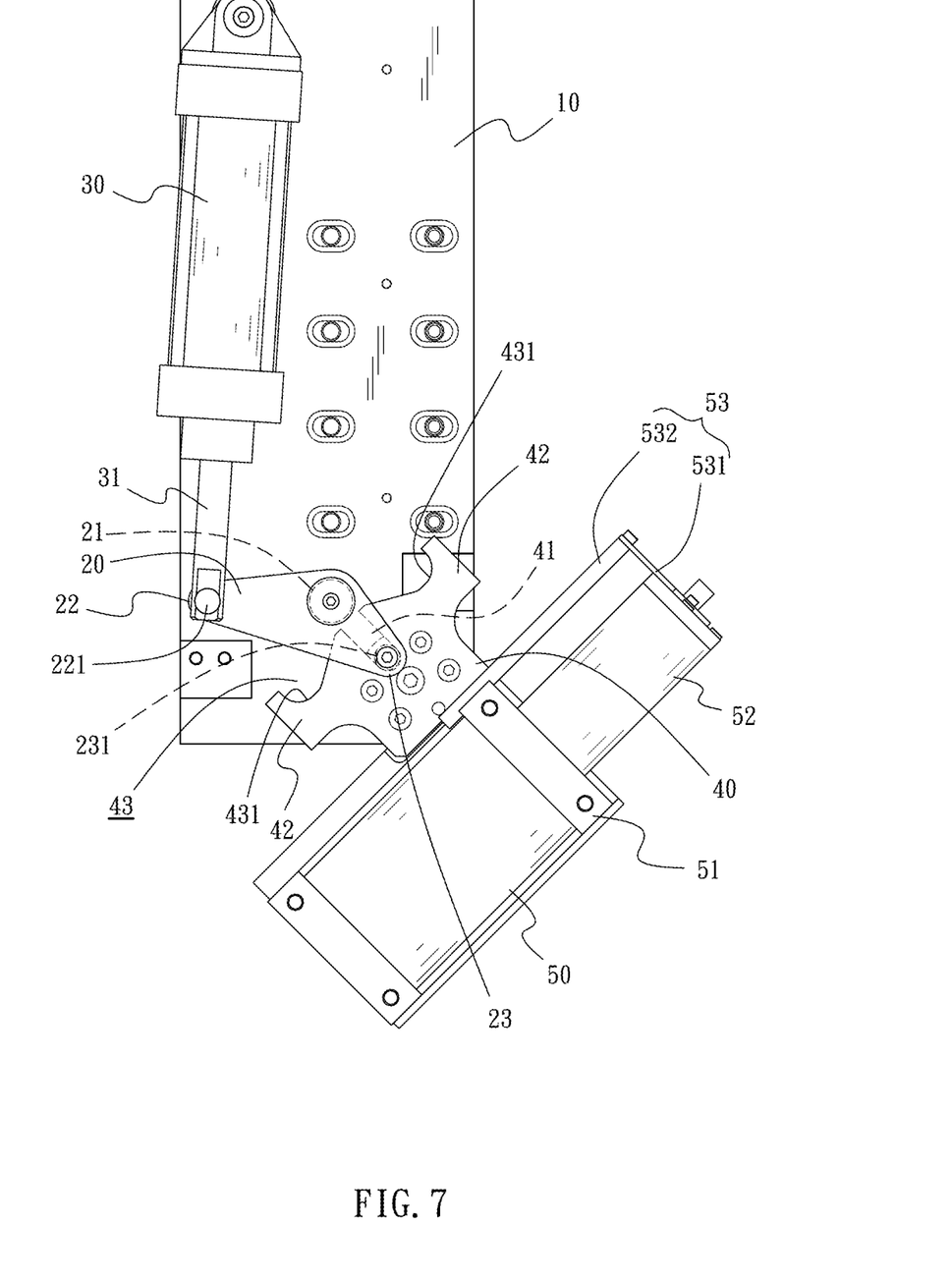
FIG. 7 is a schematic view of the present invention illustrating the tool retrieving member of FIG. 6, upon the movement member being driven by the driving member, being driven to rotate by 45 degrees by the movement member.
Figure 8:
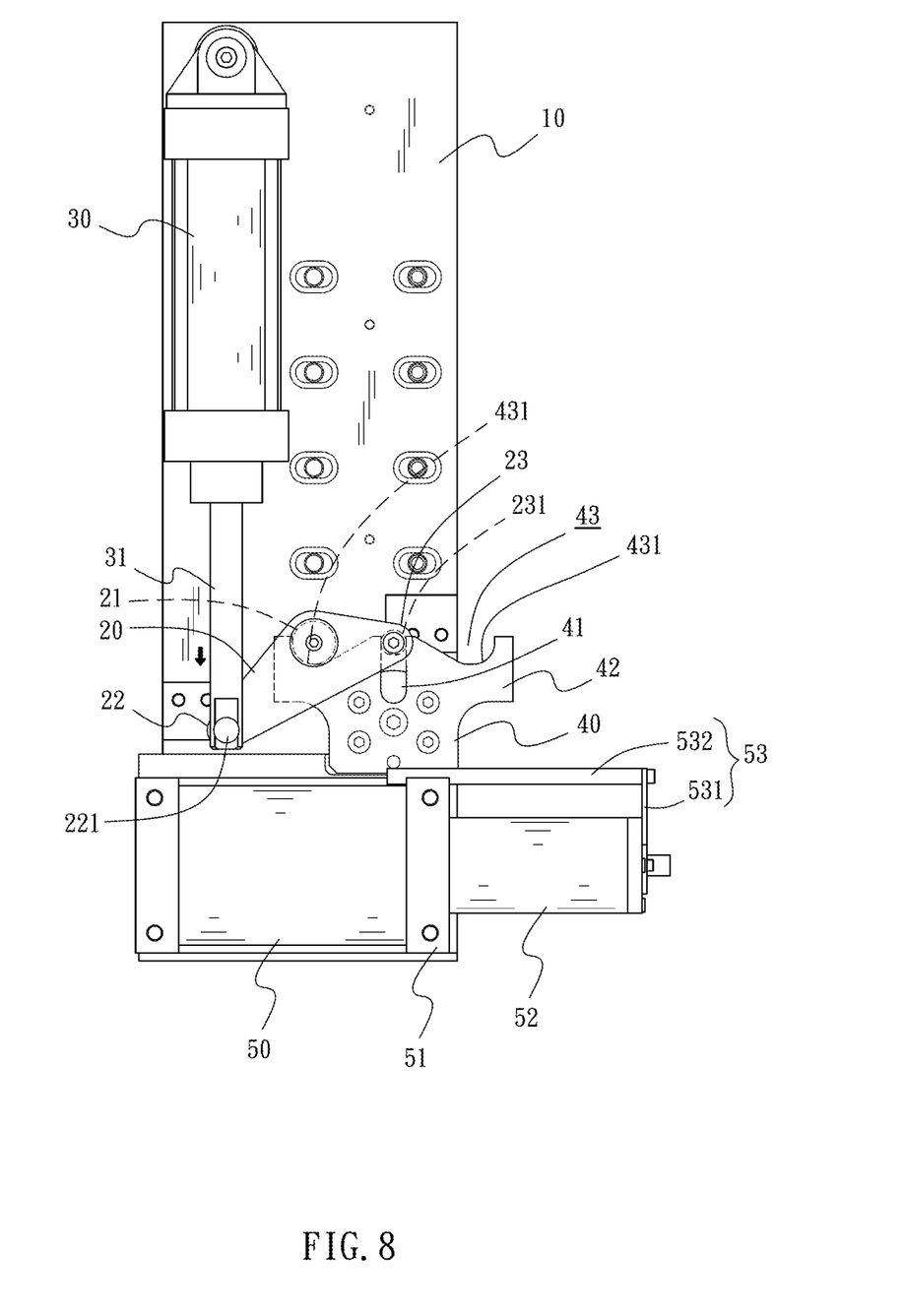
FIG. 8 is a schematic view of the present invention illustrating the tool retrieving member of FIG. 7, upon the movement member being driven by the driving member, being driven to move to the horizontal position.

The movement member 40 is pivotally connected with the base 10 and disposed adjacent to the driving member 20. The movement member 40 has a receiving portion, such that the twisting portion 23 is movable received in the receiving portion. The twisting portion 23 twists the movement member 40 along an arc route upon the rotation of the driving member 20 (as shown by FIG. 6 to FIG. 8), and the movement member 40 rotates by an angle. In an embodiment of the present invention, the rotation angle of the movement member 40 is 90 degrees. In an embodiment of the present invention, the receiving portion is an elongate groove 41 disposed on the movement member 40 corresponding to the twisting rod 231. The elongate groove 41 has an opening 411, such that the twisting rod 231 is movable received in the elongate groove 41 for twisting the movement member 40.

Also, each of the two sides of the movement member 40 has a wing portion 42 with respect to the elongate groove 41, respectively. Each wing portion 42 has an engagement groove 43. The engagement grooves 43 and the opening 411 face toward the same direction. Each engagement groove 43 forms a resisting portion 431, which deepens from the opening 411 toward the outer side of the wing portion 42. The inner wall of each resisting portion 431 is disposed corresponding to the outer wall of the rotation axle 21. The resisting portions 431 resist upon the rotation axle 21 at the vertical position P1 and the horizontal position P2, respectively, achieving a position limiting effect.

Figure 1:
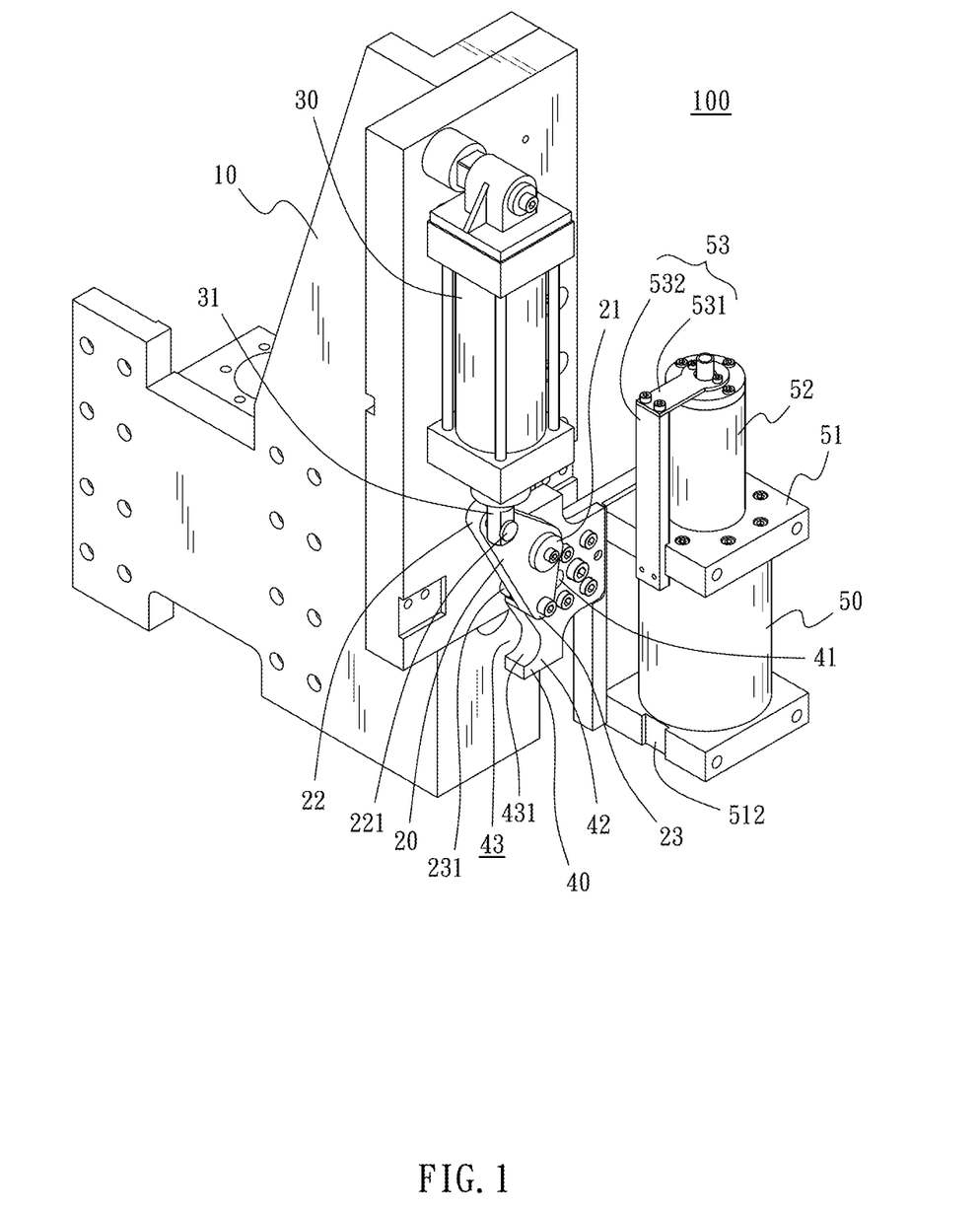
FIG. 1 is a perspective view of the tool exchange device in accordance with an embodiment of the present invention.
Figure 2:
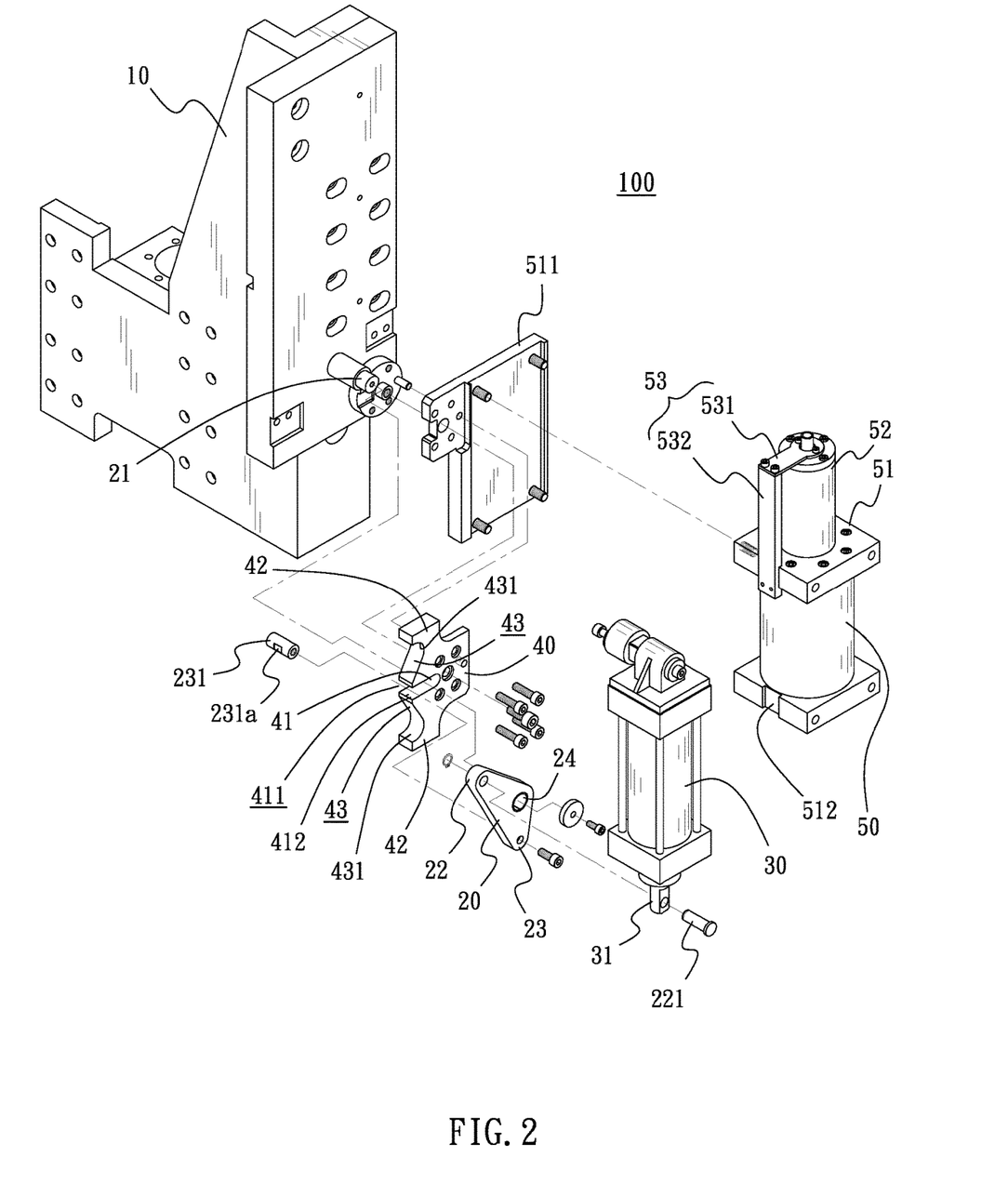
FIG. 2 is an exploded view illustrating the structural arrangement of the tool exchange device.
Figure 3:
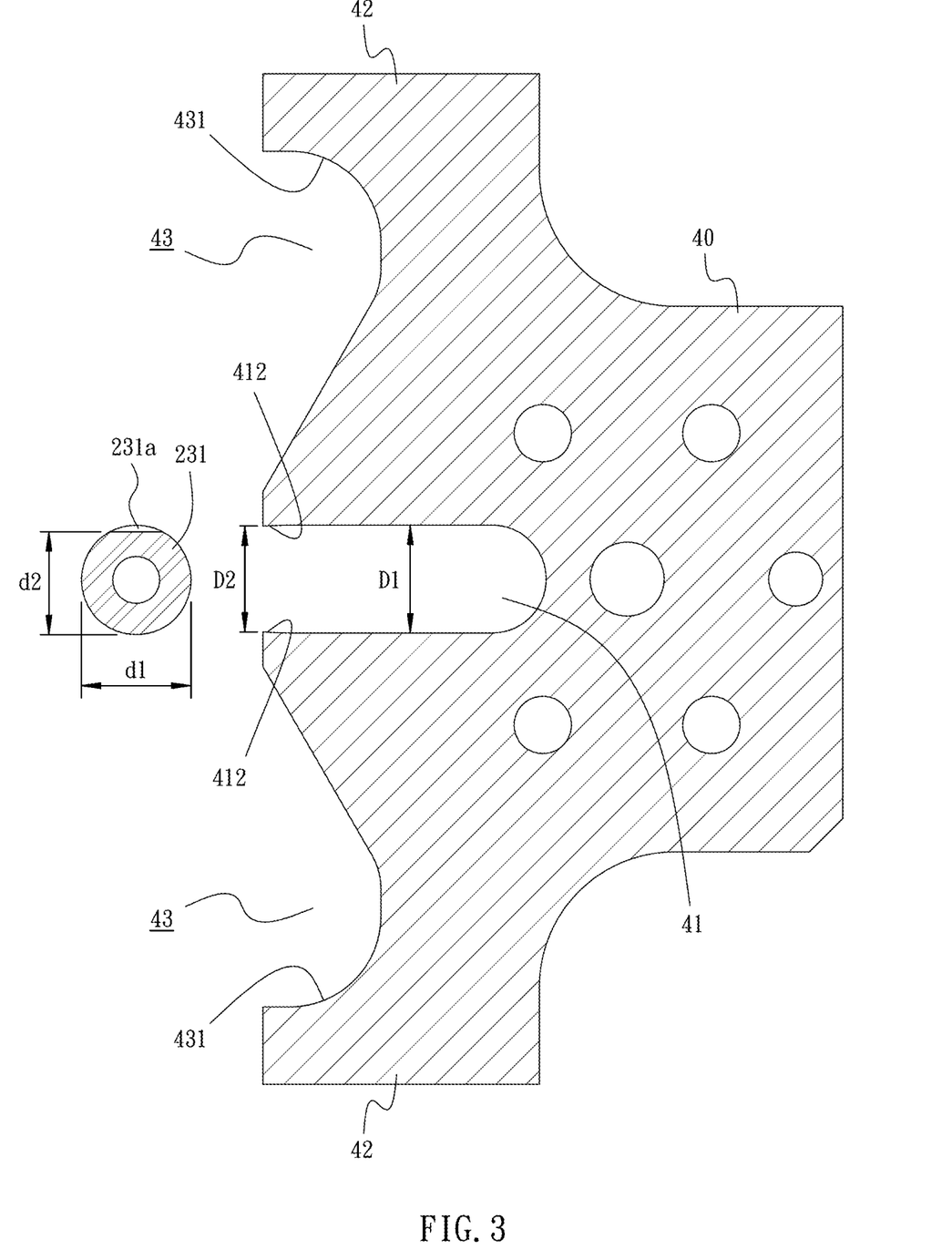
FIG. 3 is a schematic view of the present invention illustrating the position of the twist rod with respect to the elongate groove of the movement member.
Figure 4:
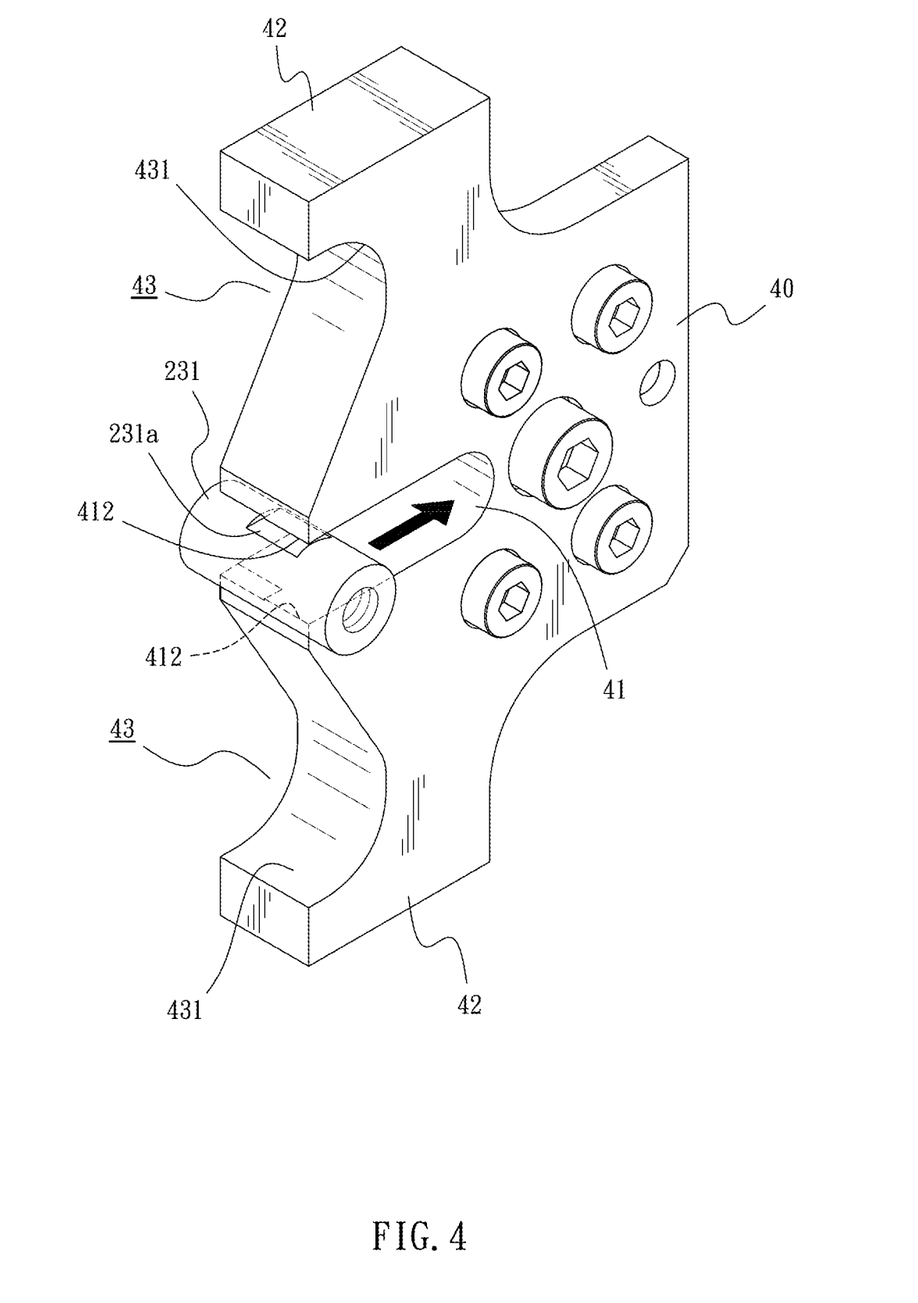
FIG. 4 is a schematic view of the present invention illustrating the twisting rod being placed from the opening into the elongate groove by the recess portion thereof with respect to the block portion.
Figure 5:
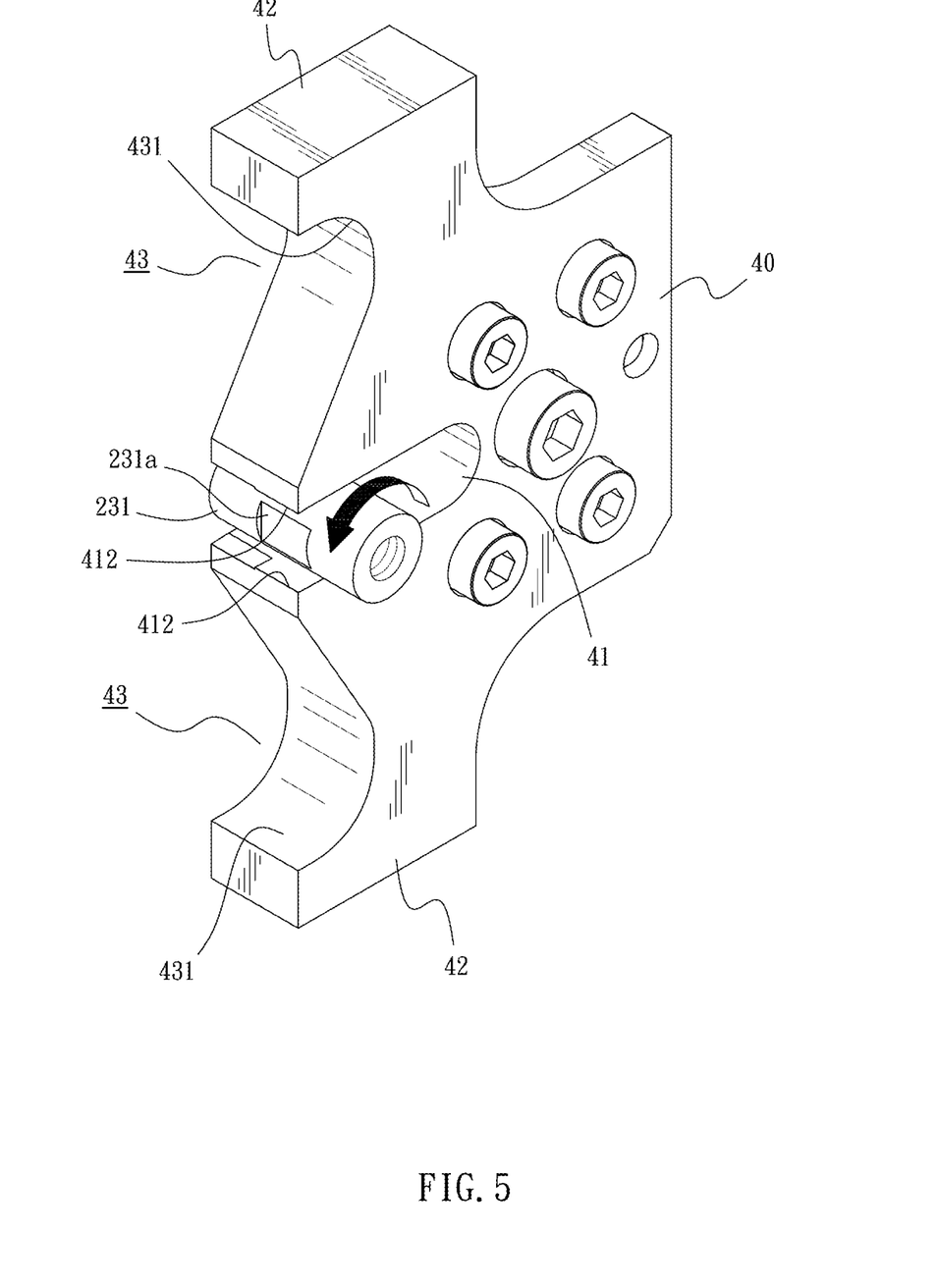
FIG. 5 is a schematic view of the present invention illustrating the twisting rod placed into the elongate groove being rotated to move the recess portion away from the block portion.

In an embodiment of the present invention, the twisting rod 231 has a rod diameter which is approximately equal to the width of the elongate groove 41. The width of the elongate groove 41 slightly tapers at the opening 411 to form a block portion 412, wherein the block portion 412 occupies approximately a half of the width of the opening 411. When the twisting rod 231 is placed in the elongate groove 41, the block portion 412 blocks the twisting rod 231 at the opening 411, such that the twisting rod 231 is prevented from being separated from the elongate groove 41. In an embodiment of the present invention, referring to FIG. 3, the elongate groove 41 has an interval D1, and the block portion 412 which tapers at the opening 411 has an interval D2. Also, the twisting rod 231 has a recess portion 231a on one side thereof, wherein the recess portion 231a radially contracts with respect to the twisting rod 231. Therefore, the twisting rod 231 has a first diameter d1, and the sectional length of the recess portion 231a passing through the sectional central point of the twisting rod 231 is defined as a second diameter d2, wherein the interval D2 is smaller than the first diameter d1 and larger than the second diameter d2, and the interval D1 is larger than the first diameter d1. Therefore, with the recess portion 231a of the twisting rod 231 being arranged in alignment with the block portion 412, the twisting rod 231 is allowed to be placed into the elongate groove 41 from the opening 411 (as shown by FIG. 4). Also, by rotating the twisting rod 231 to move the recess portion 231a away from the block portion 412, the twisting rod 231 is limited in the elongate groove 41 by the block portion 412 (as shown by FIG. 5).

Figure 9:
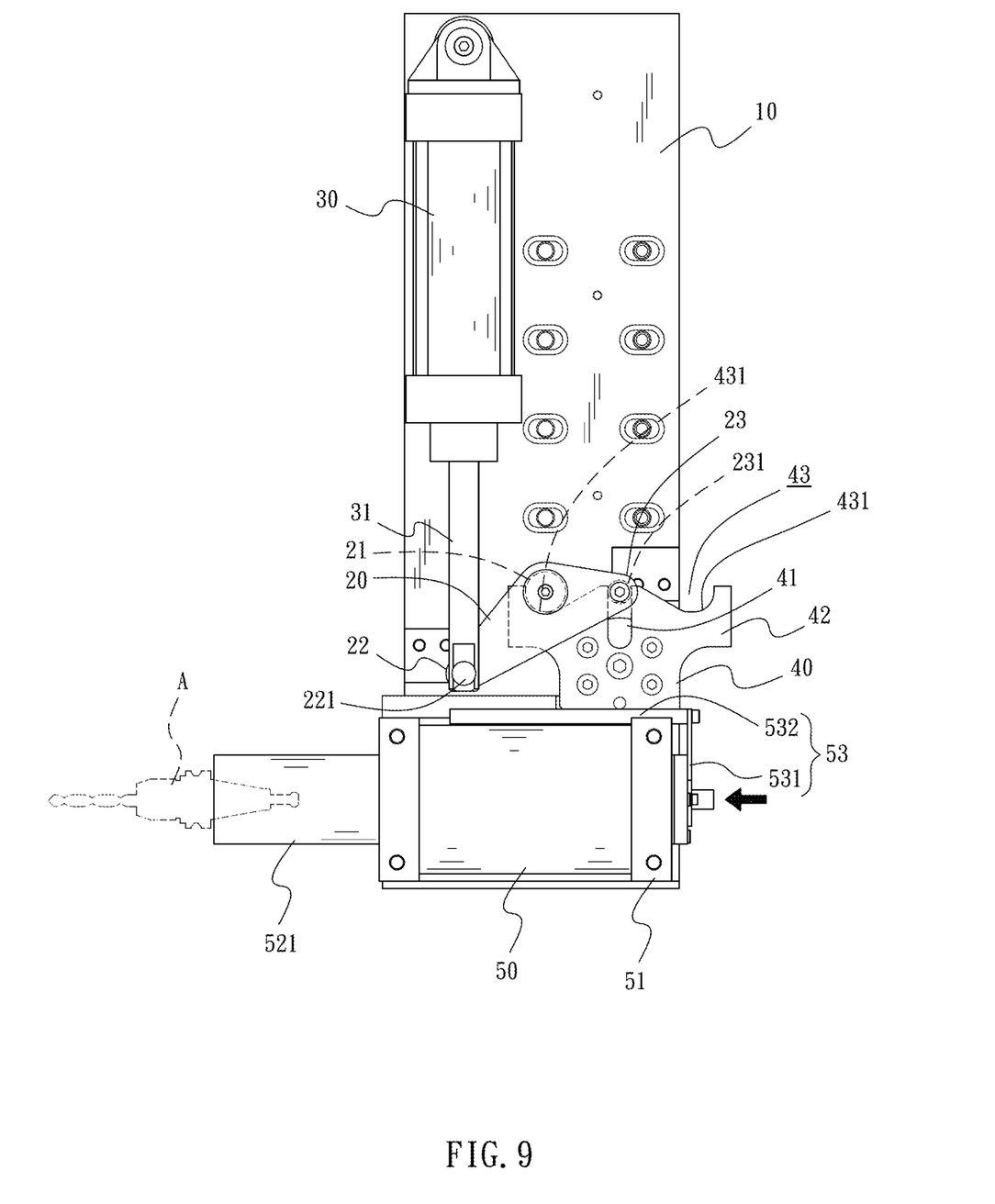
FIG. 9 is a schematic view of the present invention illustrating the tool retrieving portion of the tool retrieving member retrieving the tool with the tool sleeve extending out of the cylinder body.
Figure 10:
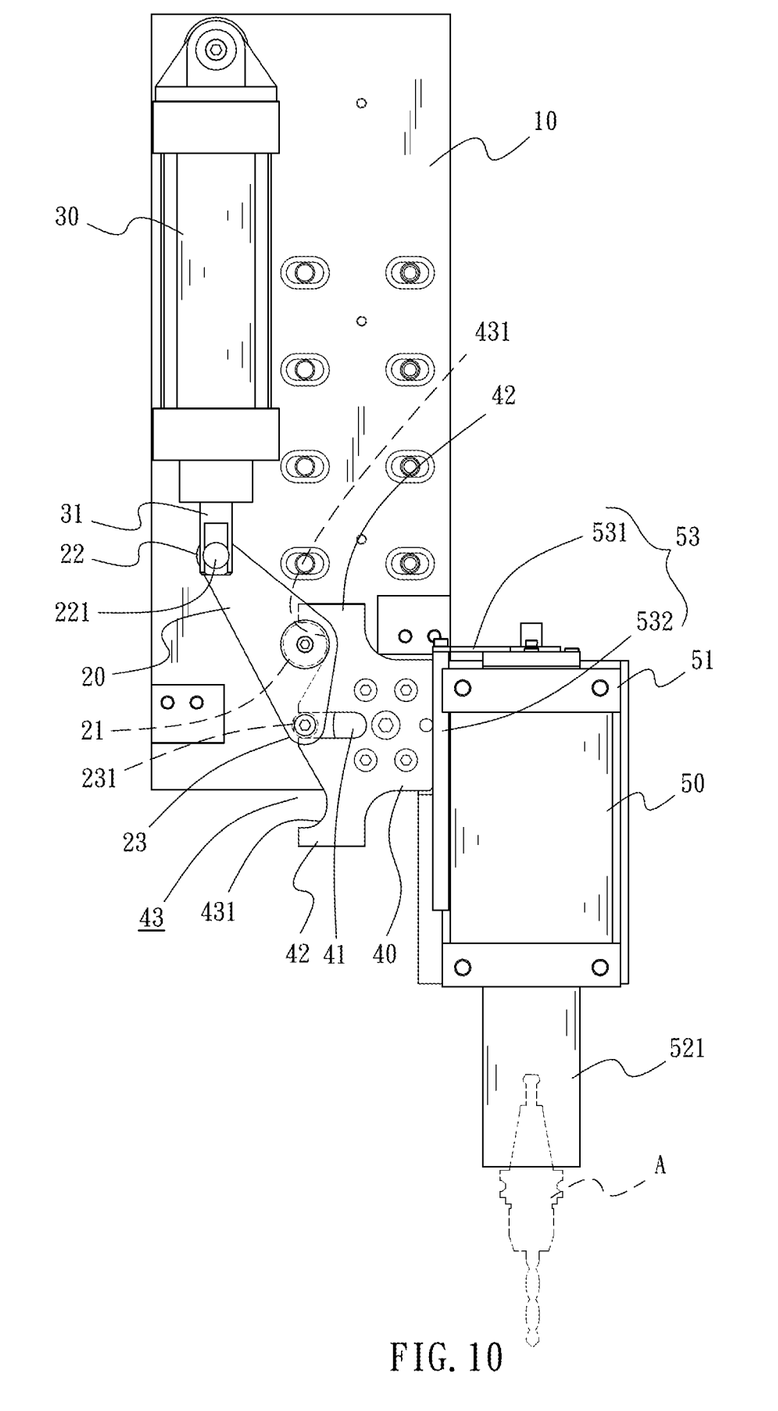
FIG. 10 is a schematic view of the present invention illustrating the tool retrieving portion of the tool retrieving member taking the retrieved tool back to the vertical position.
Figure 11:
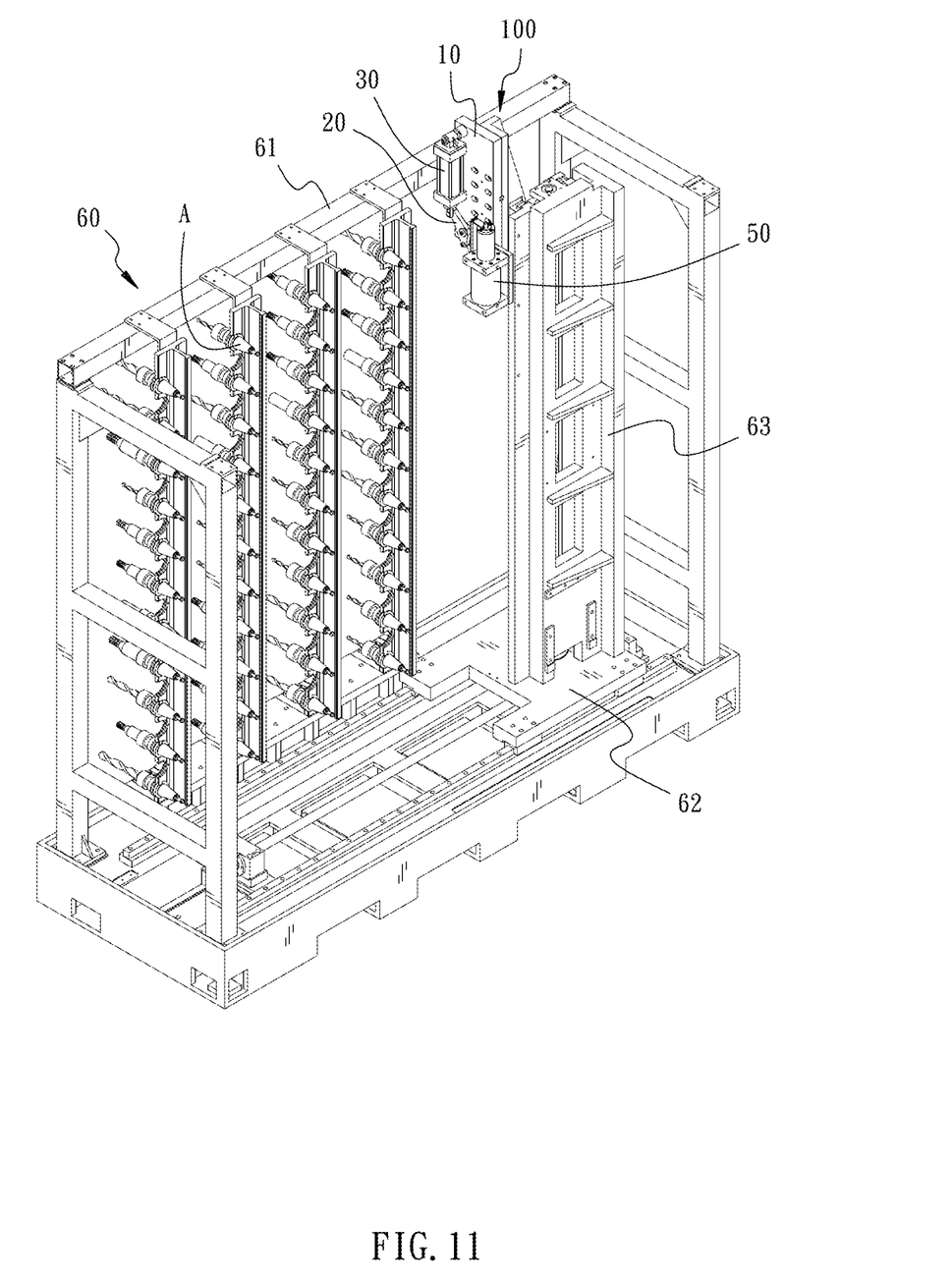
FIG. 11 is a perspective view of the tool exchange device disposed on the tool magazine.

The tool retrieving member 50 is disposed on the movement member 40. With the movement member 40 rotating by 90 degrees, the tool retrieving member 50 is allowed to sway between a vertical position P1 and a horizontal position P2. In an embodiment of the present invention, the tool retrieving member 50 has a cylinder body 51 and a tool sleeve 52, while the tool sleeve 52 is disposed in the cylinder body 51 and extendable with respect to the cylinder body 51. The cylinder body 51 has a combination portion 511, so as to be fixed to the movement member 40 by the combination portion 511, such that the cylinder body 51 is allowed to rotate by 90 degrees together with the movement member 40. In an embodiment of the present invention, the tool sleeve 52 has a tool retrieving portion 521 on one end thereof (as shown by FIG. 9 to FIG. 10). The tool sleeve 52 combines the tool A in the tool magazine 60 by the tool retrieving portion 521. Also, the tool sleeve 52 is allowed to be controlled for extending the tool retrieving portion 521 out of the cylinder body 51 or retracting the tool retrieving portion 521 back into the cylinder body 51. Therefore, the tool retrieving portion 521 is extended out of the cylinder body 51 for carrying out the tool retrieving operation, and after the tool retrieving operation, the tool retrieving portion 521 retracts back into the cylinder body 51. In an embodiment of the present invention, the cylinder body 51 applies a pneumatic pressure to control the tool sleeve 52 to extend and retract.

In addition, the cylinder body 51 has a guide groove 512 on one side thereof. The tool sleeve 52 has one end thereof away from the tool retrieving portion 521 connected with a guide member 53, and the guide member 53 is movably disposed in the guide groove 512 and extendable. Therefore, when the tool sleeve 52 extends and retracts in the cylinder body 51, the guide member 53 slides along the guide groove 512 for providing a guiding effect. In an embodiment of the present invention, the guide member 53 is formed in an L shape, which includes a horizontal section 531 and a vertical section 532. The guide member 53 has the horizontal section 531 connected with the tool sleeve 52. Also, the vertical section 532 is disposed in the guide groove 512, so as to slide along the guide groove 512.

Referring to FIG. 6, when the tool retrieving member 50 is at the vertical position P1, and the tool retrieving portion 521 of the tool sleeve 52 retracts into the cylinder body 51, such status is defined as the initial status. Further referring to FIG. 11, when the tool retrieving member 50 is used to retrieve the tool A on the tool shelf 61, with the operation of the transverse slide carriage 62 and the longitudinal slide carriage 63, the transverse slide carriage 62 drives the base 10 to move transversely, and the longitudinal slide carriage 63 drives the base 10 to move longitudinally. Therefore, the base 10 is driven to move to the position of a selected tool A, such that the tool retrieving member 50 moves to the horizontal position P2 to carry out the tool retrieving operation.

Next, when the tool retrieving member 50 is to be moved to the horizontal position P2, as shown by FIG. 7 to FIG. 8, the pressure cylinder 30 extends the piston rod 31, such that the driving member 20 connected with one end of the piston rod 31 moves counterclockwise. Meanwhile, the connection portion 22 move downward, and the twisting portion 23 reversely moves upward, causing the twisting rod 231 to move along an arc-shaped route (the route of the twisting rod 231 moving along from FIG. 6 to FIG. 8) in the elongate groove 41 to twist the movement member 40. When the movement member 40 sways to make the resisting portion 431 thereof (the resisting portion 431 on the left side of the movement member 40 in FIG. 8) resist to the rotation axle 21 to achieve a position limiting effect, the tool retrieving member 50 is moved to the horizontal position P2. Then, the tool retrieving member 50 applies the pneumatic pressure to control the tool sleeve 52 for extending the tool retrieving portion 521 out of the cylinder body 51, the tool A is sleeved by the tool retrieving portion 521 which is extended out of the cylinder body 51 (as shown by FIG. 9). Next, the transverse slide carriage 62 drives the longitudinal slide carriage 63 to slightly move transversely, so as to take out the tool A from the tool shelf 61, and take the tool A to the tool exchange position of the machine tool.

When the tool A undergoes the tool exchange operation at the tool exchange position, the tool retrieving member 50 has to move to the vertical position P1 (as shown by FIG. 10), such that the tool exchange arm (not shown) is able to rotate to take the tool. The piston rod 31 of the pressure cylinder 30 retracts, so that the driving member 20 connected with one end of the piston rod 31 moves clockwise, such that the connection portion 22 moves upward, and the twisting portion 23 moves reversely downward, causing the twisting rod 231 to move along the arc shaped route in the elongate groove 41 to twist the movement member 40. When the movement member 40 sways to make the other resisting portion 431 thereof (the resisting portion 431 on the upper side of the movement member 40 in FIG. 10) resist to the rotation axle 21 to achieve a position limiting effect, the tool retrieving member 50 is moved backed to the vertical position P1. The tool exchange arm is able to rotate to take the tool. Then, the tool retrieving member 50 applies the pneumatic pressure again to control the tool sleeve 52 for retracting the tool retrieving portion 521 back to the cylinder body 51. Meanwhile, the tool retrieving member 50 is back to the initial status as shown by FIG. 6.

With the foregoing configuration, the present invention achieves following advantages.

In the tool exchange device of the present invention, the piston rod 31 has one end connected with the movement member 40 through the driving member 20. With the driving member 20, the length between the end of the piston rod 31 and the movement member 40 is increased. Therefore, the moment arm of the present invention is longer than the moment arm of the prior art. When the piston rod 31 extends and retracts to drive the movement member 40 to accordingly move, a force-saving mechanism is realized. Therefore, the pressure cylinder 30 is allowed to have a lower force output. In other words, a specification of the pressure cylinder 30 having a lower force-output is applicable, so as to lower the cost and the space demand of the pressure cylinder 30.

Also, the driving member 20 has the twisting portion 23 twist the movement member 40, wherein the twisting rod 231 in the elongate groove 41 is applied to twist the movement member 40. The twisting portion 23 moves along an arc route, such that the tool retrieving member 50 rotate to sway between the vertical position P1 and the horizontal position P2. The force imposing position of the twisting portion 23 upon the movement member 40 moves along an arc shape route together with the swaying angle of the movement member 40, such that the wavering and the inconsistency issues of swaying speed of the tool sleeve 52 are prevented, facilitating a stable and smooth swaying of the tool sleeve 52.

With the wing portion 42 of the movement member 40 having the resisting portion 431 formed on the engagement groove 43, when the tool retrieving member 50 is at the vertical position P1 and the horizontal position P2, the two resisting portions 431 alternatively resist upon the rotation axle 21, respectively, providing a positioning effect for the movement member 40.

With the block portion 412 formed at the opening 411 in the elongate groove 41 of the movement member 40, and the corresponding recess portion 231a formed on one side of the twisting rod 231, after the twisting rod 231 is placed into the elongate groove 41 from the opening 411, the twisting rod 231 rotates to move the recess portion 231a away from the block portion 412. Therefore, when the twisting rod 231 in the elongate groove 41 moves toward the opening 411, the first diameter d1 of the twisting rod 231 is larger than the interval D2 of the block portion, so as to prevent the twisting rod 231 from being separated from the elongate groove 41. Therefore, the twisting rod 231 is positioned in the elongate groove 41.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tool exchange device of a tool magazine, comprising:
   a base;
   a driving member pivotally connected with the base by an axle member, a connection portion and a twisting portion being disposed on two opposite ends of the driving member, a distance between the connection portion and the axle member being larger than a distance between the twisting portion and the axle member;
   a pressure cylinder disposed on the base and having an extendable piston rod, one end of the piston rod being pivotally connected with the connection portion such that the piston rod is configured for driving the driving member to rotate about the axle member;
   a movement member pivotally connected with the base and neighboring the driving member, the movement member having a receiving portion, a section of the twisting portion being movably received in the receiving portion so as to be movable relative to the receiving portion, the twisting portion pivoting the receiving portion upon a rotation of the driving member, such that the movement member rotates by a rotation angle; and
   a tool retrieving member disposed on the movement member, the tool retrieving member swaying between a vertical position and a horizontal position according to the rotation angle of the movement member.

2. The tool exchange device of claim 1, wherein the connection portion has a rotation axle, and the section of the twisting portion comprises a twisting rod, wherein an axle bore is disposed between the connection portion and the twisting portion, such that the axle member passes through the axle bore to be pivotally connected to the base; one end of the pressure cylinder away from the piston rod is pivotally connected to the base and is swayable, and one end of the piston rod of the pressure cylinder is connected with the rotation axle; the receiving portion is an elongate groove that is disposed on the movement member and that corresponds to the twisting rod, and the elongate groove has an opening for movably receiving the twisting rod in the elongate groove, such that the twisting rod pivots the receiving portion.

3. The tool exchange device of claim 2, wherein each of two sides of the movement member with respect to the elongate groove has a respective wing portion; each wing portion has a respective engagement groove, the engagement grooves and the opening open toward a same direction, each engagement groove forms a respective resisting portion which deepens from the opening toward an outer side of the corresponding wing portion, a respective inner wall of each resisting portion is disposed corresponding to an outer wall of the axle member; one of the resisting portions resists upon the axle member when the tool retrieving member is at the vertical position and the other of the resisting portions resists upon the axle member when the tool retrieving member is at the horizontal position, the resisting of the resisting portions upon the axle member achieving a position limiting effect.

4. The tool exchange device of claim 3, wherein a rod diameter of the twisting rod is defined as a first diameter, which is equal to a width of the elongate groove; a width of the elongate groove tapers at the opening to form a block portion; when the twisting rod is in the elongate groove, the block portion prevents the twisting rod from being separated from the elongate groove.

5. The tool exchange device of claim 4, wherein the twisting rod has a recess portion formed on one side thereof, and the recess portion is recessed in the twisting rod in a direction that is radial with respect to a longitudinal direction of the twisting rod; wherein a sectional dimension of the twisting rod at the recess portion along a line passing through a sectional center point of the twisting rod is defined as a second diameter, which second diameter is smaller than an interval of the block portion; wherein when the recess portion of the twisting rod is arranged in alignment with the block portion, the twisting rod is placed into the elongate groove from the opening; and wherein when the twisting rod is rotated to move the recess portion away from the block portion, the twisting rod is limited in the elongate groove by the block portion.

6. The tool exchange device of claim 1, wherein the tool retrieving member has a cylinder body and a tool sleeve, wherein the tool sleeve is disposed in the cylinder body and is extendable with respect to the cylinder body; the cylinder body has a combination portion fixed to the movement member, such that the cylinder body rotates by the rotation angle together with the movement member; the tool sleeve has a tool retrieving portion on one end of the tool sleeve; and the tool sleeve is controlled for extending the tool retrieving portion out of the cylinder body to retrieve a tool and for retracting the tool retrieving portion back into the cylinder body when the tool is retrieved.

7. The tool exchange device of claim 6, wherein the cylinder body has a guide groove on one side of the cylinder body, and an end of the tool sleeve that is opposite to the one end is connected with a guide member, such that the guide member is movably disposed in the guide groove and is extendable; and wherein when the tool sleeve extends from and retracts in the cylinder body, the guide member slides along the guide groove for providing a movement guiding effect.

8. The tool exchange device of claim 7, wherein the guide member is formed in an L shape including a horizontal section and a vertical section; the horizontal section of the guide member is connected with the tool sleeve, and the vertical section is disposed in the guide groove and slidable with respect to the guide groove.

9. The tool exchange device of claim 1, wherein the rotation angle is 90 degrees.

10. The tool exchange device of claim 1, wherein the tool magazine comprises a tool shelf, a transverse slide carriage, and a longitudinal slide carriage; the base is fixed on the longitudinal slide carriage, and the longitudinal slide carriage is slidably disposed on the transverse slide carriage; the transverse slide carriage drives the base to move transversely, and the longitudinal slide carriage drives the base to move longitudinally.

* * * * *